Aug. 19, 1930.  C. E. McGIRK  1,773,628

HOLDER

Filed April 3, 1929

Charles E. McGirk, Inventor

By Vernon E. Hodges his Attorney

Patented Aug. 19, 1930

1,773,628

UNITED STATES PATENT OFFICE

CHARLES E. McGIRK, OF PHILIPSBURG, PENNSYLVANIA

HOLDER

Application filed April 3, 1929. Serial No. 352,235.

This invention relates to an improvement in holders.

The object of the invention is to provide for lifting and carrying sterilized basins, trays and pans from the sterilizers to the operating table in hospitals, or wherever it may be desired to use a holder of this character. These pans are often full of boiling water and it is important to remove the sterilized pans without contamination, and this is effectively accomplished by the use of a holder of this character, which may itself be sterilized and with which the pans may be picked up and removed without danger of contamination or dropping them.

Figure 1:
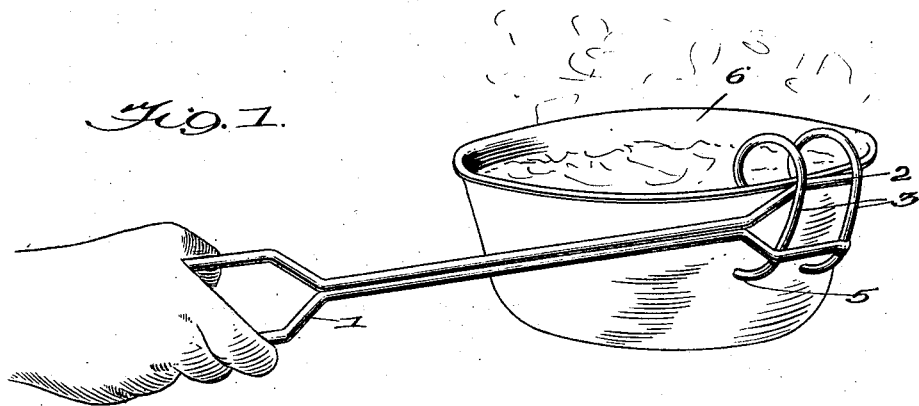
Fig. 1 is a perspective view of the invention applied.
Figure 2:
Fig. 2 is a perspective view of the holder from a different angle.

The numeral 1 designates the handle of the holder, which in the form shown is constructed of a single length of wire bent upon itself to form this handle and terminating at its outer end in the prongs 2. These prongs are spaced apart, as shown clearly in Fig. 2.

Welded, soldered or otherwise secured to the prongs 2 are holding members 3, of which two are preferably employed, as illustrated in the drawings, although more or less may be used if desired. Each of these holding members is connected with both of the prongs on opposite sides thereof, as clearly illustrated in Figs. 2 and 3.

Figure 3:
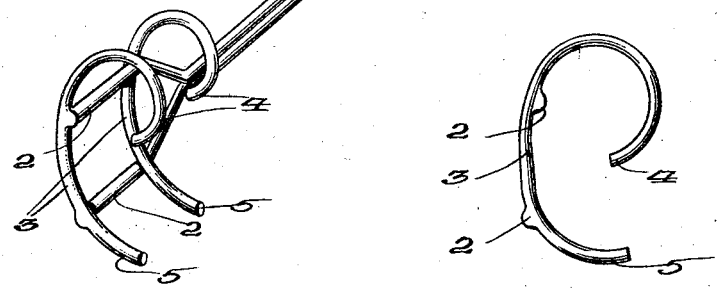
Fig. 3 is an end view of the same.

As also shown in Fig. 3, the holding or supporting members are of generally spiral shape and have the jaws 4 and 5 thereof arranged approximately in alignment with each other and preferably with the jaw 5 extending beyond the end of the jaw 4, so as to form a complete convolution. The jaws 4 and 5 are spaced apart in the formation of the spirally shaped holding members, and are designed to receive a pan, tray or suitable element designated by the numeral 6 in the drawings, so as to lift and support said element.

In using the invention, the jaws 4 are hooked over the inside of the pan, tray or the like, while the jaws 5 engage said pan or tray on the outside so that the jaws engage on the inside and outside of the rim, and by applying a slight outward pressure to the handle, the operator is enabled to lift the pan or tray by means of engage said pan or tray on the outside so that the jaws engaging on opposite sides of the rim thereof, without spilling the contents or dropping such pan or tray.

The entire holder may be constructed of any suitable material, such as nickle or stainless steel or the like. By the use of a holder of this character, it is possible to lift and remove pans or trays from the sterilizer and operating table without contamination or without dropping them and spilling their contents.

The invention may also be applied wherever it may be desired to lift or move pans, trays or the like and wherever it may be found convenient.

I claim:

1. A holder of the character described comprising a supporting member formed in a generally spiral shape and extending throughout an approximately complete convolution thereof to engage an article on different sides thereof.

2. A holder of the character described comprising a supporting member formed in a generally spiral shape and extending throughout an approximately complete convolution thereof to engage an article on different sides thereof, and a handle connected with said supporting member.

3. A holder of the character described comprising a plurality of holding members, each having at least two jaws arranged approximately in alignment and longitudinally of the holder, and a handle having a forked end, the forks of which are secured to each of the holding members on opposite sides of one of the jaws thereof.

4. A holder for pans or the like, comprising at least two contact points adapted to engage the pans on the inside, and cooperating contact points rigidly fixed to the first contact points for engaging the pans on the outside, and a handle rigidly fixed to the holder.

5. A holder for pans or the like comprising at least two hook-shaped contact points for engaging the pans on the inside, and at least two cooperating contact points rigidly fixed to the first contact points and disposed approximately in an opposite direction for engaging the outside of the pans, and a handle rigidly fixed to the holder.

6. A holder for pans or the like comprising at least two hook-shaped contact points for engaging the pans on the inside, and at least two cooperating contact points rigidly fixed to the first contact points and disposed approximately in an opposite direction for engaging the outside of the pans, and a handle extending laterally from said holder, and rigidly fixed thereto.

7. A holder for pans or the like comprising at least two holding members joined together and formed of metal and bent into an approximately spiral shape, with an enlarged eye for receiving the rim of the pan, the extreme ends of the holding members being bent in opposite directions for engaging opposite sides of the pan, and a handle connected with the holding members.

8. A holder for pans or the like comprising at least two holding members, each formed of a wire bent into an approximately spiral shape and with an enlarged eye for receiving the rim of the pan, the extreme ends of the wire being bent in opposite directions for engaging opposite sides of the pan, and a handle member rigidly fixed to both of said holding members.

9. A holder of the character described having a plurality of jaws rigidly connected together, and arranged in pairs and extending in opposite directions for respectively engaging on opposite sides of a pan.

10. A holder for pans or the like having a plurality of holding jaws arranged in pairs, the jaws of one pair being rigidly fixed to and extending in a direction approximately opposite to the jaws of the other pair for engaging different sides of a pan.

11. A holder for pans or the like comprising a body portion arranged in a generally spiral shape, and having a plurality of holding jaws arranged in pairs, the jaws of one pair extending in an opposite direction from the jaws of the other pair for engaging different sides of a pan.

12. A holder for pans or the like comprising a body portion arranged in a generally spiral shape, and having a plurality of holding jaws arranged in pairs, the jaws of one pair extending in an opposite direction from the jaws of the other pair for engaging different sides of a pan, the corresponding jaws of the different pairs being arranged approximately in the same vertical plane to engage the pan at corresponding points.

13. A holder for pans or the like comprising a body portion arranged in a generally spiral shape, and having a plurality of holding jaws arranged in pairs, the jaws of one pair extending in an opposite direction from the jaws of the other pair for engaging different sides of a pan, the cooperating jaws of the different pairs being arranged approximately in the same vertical plane to engage the pan at corresponding points, and a handle rigidly fixed to said body portion.

In testimony whereof I affix my signature.

CHARLES E. McGIRK.